Nov. 22, 1966 P. E. VESILIND 3,287,477
PROCESS AND APPARATUS FOR EXTRUDING A FOAMED PLASTIC
Filed June 17, 1963 4 Sheets-Sheet 1

INVENTOR.
PAUL E. VESILIND
BY Ronald S. Cornell
his Attorney

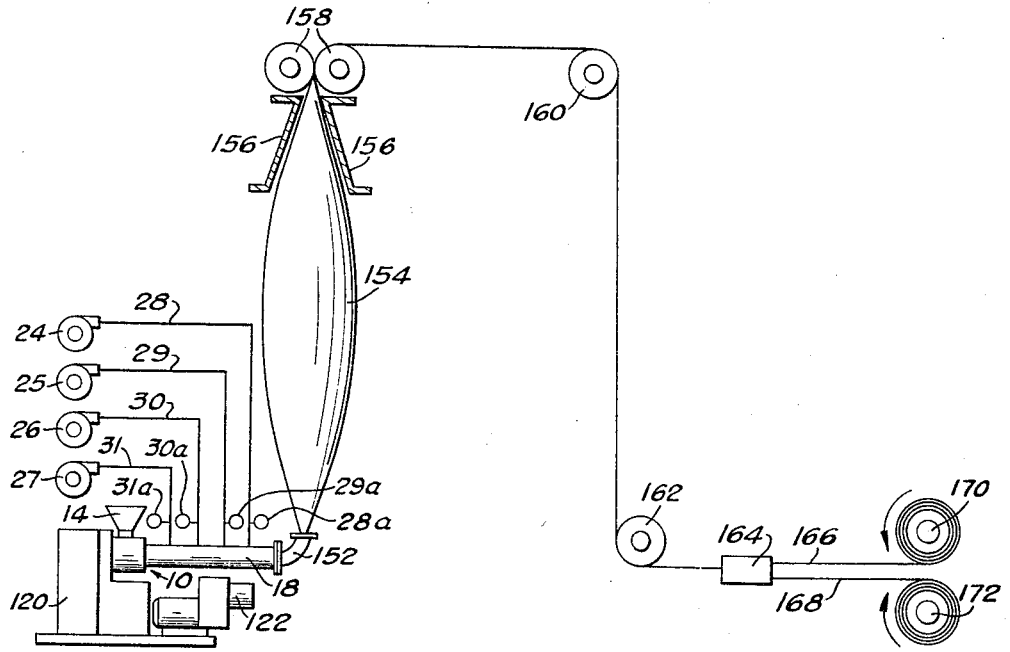
FIG. 6
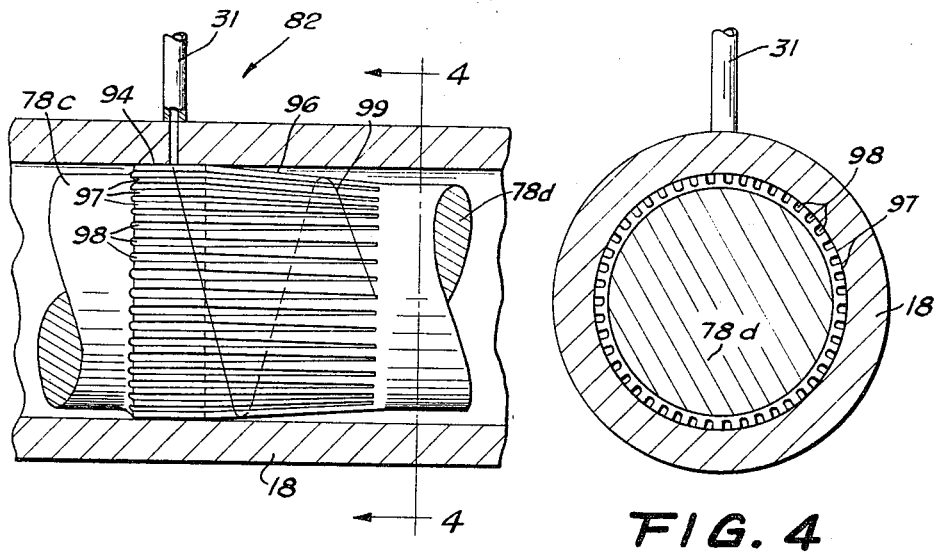
FIG. 3
FIG. 4
INVENTOR.
PAUL E. VESILIND
BY Ronald S. Cornell
his Attorney Nov. 22, 1966 P. E. VESILIND 3,287,477
PROCESS AND APPARATUS FOR EXTRUDING A FOAMED PLASTIC
Filed June 17, 1963 4 Sheets-Sheet 3

INVENTOR.
PAUL E. VESILIND
BY Ronald S. Cornell
his Attorney

United States Patent Office 3,287,477
Patented Nov. 22, 1966

3,287,477
PROCESS AND APPARATUS FOR EXTRUDING
A FOAMED PLASTIC
Paul E. Vesilind, Beaver, Pa., assignor to Koppers
Company, Inc., a corporation of Delaware
Filed June 17, 1963, Ser. No. 288,309
14 Claims. (Cl. 264—53)

This invention relates generally to extrusion apparatus and methods.

Thermoplastic materials are commonly fabricated into various shapes by extruding the materials through a die. It is common practice to mix various solid pigments and other additives of low volatility with the thermoplastic material as it is fed into the extruder whereupon the extruder screw acts to blend the ingredients together. Problems are presented, however, when an ingredient to be introduced into the thermoplastic material is volatile or reactive with the thermoplastic material.

A considerable disadvantage encountered when attempting to introduce a volatile expanding agent into the barrel of an extruder is that a portion of the expanding agent tends to flow through the extruder in an upstream direction (contra to the flow of the polymer therein) and thence through the feeding hopper and out into the atmosphere. In addition, it has heretofore been necessary when incorporating additives in the polymer to pass the polymer twice through an extruder in order to obtain a homogeneous mixture.

When a reactive ingredient is mixed with the thermoplastic material and then fed to an extruder the mixture is not homogeneous and the reactive ingredient begins reacting with the thermoplastic material. Since the reactive ingredient is present in great quantities in certain locations and in minor quantities in other locations, the reaction is irregular and not uniform. As a result, one portion of the thermoplastic material has been highly reacted with the ingredient yet another portion has only mildly reacted. A non-uniform product, of course, is not desirable.

In accordance with this invention, thermoplastic is admixed with highly comminuted increments of usually fluid material under intense and novel conditions of shear while maintaining a controlled viscosity of the thermoplastic thereby to produce an extruded product of uniform extrudability and novelly homogeneous constitution. The novel thermoplastic composition so obtained is characterized in appearance by a transparency not heretofore observed in similar products and in constitution by a stability and behavior resulting so far as one can theorize from the intense subdivision of additive in the plastic.

In operation of the extruder, a molten mass of thermoplastic that is moving longitudinally in a helical fashion within an extruder barrel is split into a plurality of small streams by a choke. A controlled increment of material is added to each of the streams by means of a conduit through which the material is passed. The choke is provided with a plurality of longitudinal grooves each of which slice off a tiny amount of the added material as the choke is rotated. In this manner, a small amount of material is passed into each of the grooves of the choke to be added to the streams of molten mass. As the streams are recombined and moved again longitudinally as a molten mass, a portion of the choke subjects the mixture of added material and molten mass to controlled shearing and mixing.

The viscosity of the molten mass must be controlled during the passage of the mass along the extruder. This is accomplished by lowering the temperature of the molten mass as it passes through the extruder barrel. The temperature, however, cannot be controlled in an ordinary extruder because of the large amounts of heat imparted to the molten mass by the shearing effect produced within the extruder barrel. The extruder of the invention while providing a high intensity of shearing and consequent mixing, avoids such excessive heating by providing for an increase in the channel depth of the extruder screw towards the downstream end of the extruder barrel. In order to avoid undesirable side effects when the channel depth is increased, the pitch of the screw is decreased to that predetermined extent that will supply a uniform rate of flow within the barrel. The channel cannot have a relatively large depth throughout the entire length of the extruder barrel because under these conditions the desired mixing and shearing action will not occur.

This invention also comprehends an extruder having a barrel of uniform diameter with a screw therein of novel construction and design. The screw has helical flights of predetermined, varied pitch and depth for advancing thermoplastic material longitudinally of the barrel, thereby placing the material under pressure and working it into a molten mass under controlled conditions of viscosity. One or more chokes of novel configuration are provided said chokes having longitudinal grooves therein which divide said flights. Said grooves function to connect the channels on each side of said choke. A port is provided in the barrel of the extruder opposite each choke to coact with the longitudinal grooves of the choke so that additive material is introduced into the grooves during periods of momentary juxtaposition while the choke rotates. Each port is provided with positive pressure apparatus and a small bore conduit to force the additive material into the longitudinal grooves of the choke.

In the drawings wherein like parts are marked alike:

FIGURE 3 is a blown-up view showing a choke portion of the extruder screw of FIGURE 1;

FIGURE 4 is a cross-sectional view taken on lines 4—4 of FIGURE 3;

FIGURE 6 shows a partially schematic elevational side view of an embodiment of apparatus for directly forming a foam film from a thermoplastic polymeric material.

Figure 1:
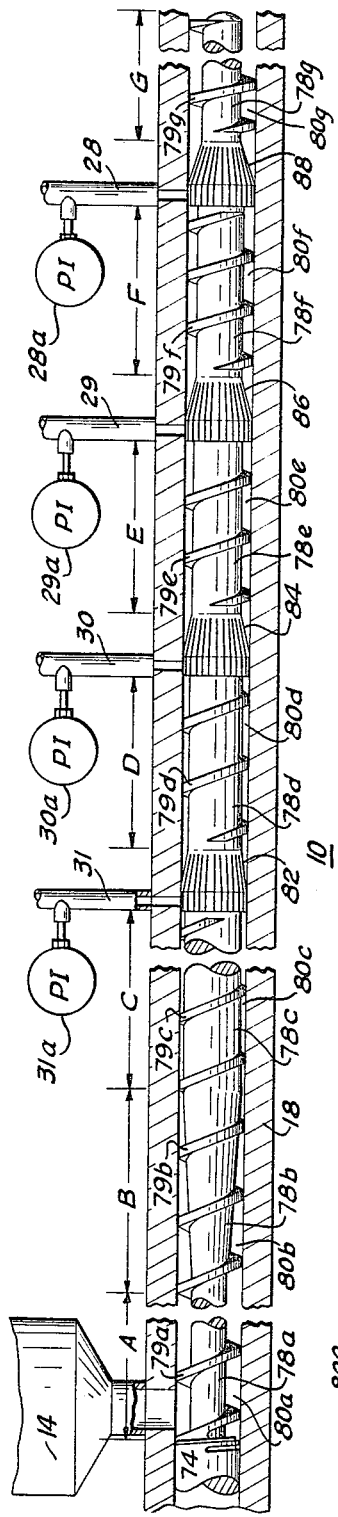
FIGURE 1 shows an elevational cross-sectional side view of an embodiment of the novel extruder barrel and screw of the invention.
Figure 2:
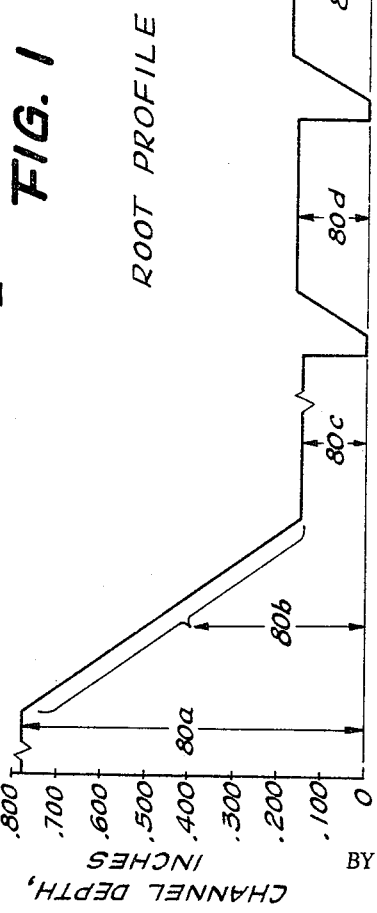
FIGURE 2 is a graph showing a profile of the root of the extruder screw of FIGURE 1 versus length location.

Referring now to the drawings, the extruder is designated generally 10. As is conventional in extrusion equipment, FIGURES 1, 5, and 6, particles of the thermoplastic material flow downwardly through hopper 14 into the channel 80 (FIGURE 1) between the flights 79 of screw 74. These flights advance the material along a barrel 18 of uniform diameter and out through a die. The heat generated by the compression and mechanical working of the particles of thermoplastic material, aided if desired by heating zones, converts the particles of thermoplastic material in barrel 18 into a molten mass. Excess heat is removed at cooling zones. Such heating zones and cooling zones may be of conventional construction.

In accordance with this invention, the extruder has a provision for the controlled introduction of an increment of an additive into the molten mass and for the dispersion of this increment homogeneously through the mass.

Turning now to FIGURE 1, the particles of thermoplastic material flow through the hopper into the relatively large channel 80a of feed zone A of the screw. As the material advances downstream, it flows through a transition zone B having a gradually narrowing channel depth. Under the influence of the mechanical working and the pressure and the application of heat, the particles change to a thermoplastic molten mass. At the metering section C, a channel of relatively shallow depth meters or measures the flow of material so that only a predetermined amount of material is advanced beyond this section. The pitch of the flights 79a, 79b, and 79c in sections A, B, and C is uniform.

In accordance with this invention, the flight of the screw is divided by a choke 82 which provides for the introduction into and homogeneous dispersion of a controlled increment of an additive in the molten mass. Choke 82, FIGURE 3, has an upstream portion 94 of cylindrical shape with a maximum outer diameter identical to the outer diameter of the flights 79. There is an abrupt change from root diameter 78c to cylindrical portion 94. Choke 82, however, has a downstream portion 96 which is tapered from the cylindrical portion 94 to the diameter of downstream root 78d. The diameter of root 78c is larger than the diameter of root 78d.

The choke 82 is provided with longitudinal grooves 98 which extend parallel to the axis of the screw. The depth of the longitudinal grooves 98 extends to the outer circumference of the upstream root 78c. Since the root 78d is smaller in diameter than the root 78c, grooves 98 do not extend the full length of the downstream portion 96 but terminate prior to the juncture of portion 96 with root 78d.

Advantageously, flight 79c terminates a substantial distance away from cylindrical portion 94. This permits the molten mass to flow evenly around the circumference of the root 78c to provide even distribution of the molten mass into the longitudinal grooves 98 of the choke 82.

The cylindrical portion 94 divides the molten mass into a plurality of streams which flow forwardly through the grooves 98. Advantageously, the summation of the cross-sectional areas of the grooves 98 is about one-half of the cross-sectional area of the channel 80; the cross-sectional area of channel 80 being defined as the product of the channel depth times the pitch of the flights. Thus, the molten mass flows longitudinally through the grooves 98 at about twice the velocity it flows longitudinally through channel 80.

The chokes 82, 84, 86, 88 permit the introduction and homogeneous dispersion of a controlled increment of another material into the molten mass. This other material is injected into the extruder barrel 18 through conduit 31 into the grooves 98 of choke 82. Advantageously, the material is injected into the longitudinal grooves at a point midway of the length of the cylindrical portion 94. If the material be injected too far upstream, it may tend to flow in an upstream direction, and if the material is injected too far downstream, the desired degree of mixing may not be obtained.

The lands 97 and the grooves 98 break the flow of added material into droplets which flow downstream thruogh grooves 98 along with the thermoplastic material and are mixed with the thermoplastic material. The longitudinal rate of flow diminishes as it traverses the tapered portion 96. In this tapered portion, the individual streams from grooves 98 tend to mix and to assume the prior helical flow; the mixing being a combination of shear and extrinsic mixing between the choke and the barrel.

Flight 79 continues as flight 79d from a point a substantial distance beyond the intersection of tapered portion 96 and root 78d. This permits the added material to be dispersed in the thermoplastic material prior to being forced by flight 79 onwardly through mixing section 78d. This gradual integration of the small streams into a thermoplastic mass is thus accomplished without sudden changes in pressure which could cause localized flashing of volatile material.

In section D, the channel depth 80d is greater than the channel depth 80c of the metering section C and the pitch of the threads 79d is smaller than the pitch of the threads 79c. Flight 79d is interrupted by a choke 84 having a configuration similar to that of choke 82, but varying in dimensions because of the change in the diameter of the root 78. Following choke 84 is a second mixing section E having a channel depth 80e of somewhat larger depth than the channel depth 80d in section D. The pitch of the threads 79e in section E is somewhat less than the pitch of the threads 79d in section D.

Immediately downstream of section E is another choke 86 similar in form to those described hereinabove, and downstream of choke 86 is positioned another mixing section F having a channel depth 80f somewhat deeper than the channel depth 80e of section E. The pitch of the threads 79f is smaller than the pitch of the threads 79e. Downstream of section F is a fourth choke 88 of similar configuration of the aforementioned choke and shown in FIGURE 4. Downstream of choke 88 is a final mixing section G having a deeper channel depth 80g than the channel depth 80f of section F. The pitch of the threads 79g in section G is smaller than the pitch of the threads 79f in section F.

Beyond section G is a die of desired configuration. The shape and dimensions of this die, as is well known, will depend upon the product to be made.

The relationship between the channel depth in sections C, D, E, F, and G and the pitch of the threads in these same sections is such that the cross-sectional area of the channel remains substantially constant, i.e., within a tolerance of ±5%.

The apparatus of this invention is particularly adaptable to the production of an expandable or expanded thermoplastic resin. Particles which will expand and fuse together under the influence of heat to form cellular or foamed plastic masses heretofore have been made by adding a volatile liquid or a gaseous compound or a solid substance which decomposes under the action of heat to form a gas to a thermoplastic material. The most widely used expandable polymer comprises polymeric particles in bead form having an aliphatic hydrocarbon incorporated therein as an expanding agent. Such particles can be subjected to heat as by extrusion, probe molding, or injection molding to produce the foamed structure.

It has been proposed to incorporate the expanding agent by direct injection in a molten mass of plastic in a suitable mixer such as an extruder. It has been difficult to inject a controlled amount of expanding agent into the mass in an extruder because the expanding agent forms a bubble in the polymeric mass and therefore does not mix readily with the viscous polymer.

It becomes possible by the use of the apparatus of this invention to inject a controlled increment of material to each of the small streams flowing longitudinally through the chokes of the screw. To this end, polymeric particles 12, FIGURE 5, feed from hopper 14 to the extruder screw 74 (shown in detail in FIGURE 1) in the barrel 18 of the extruder 10. In a conventional manner, a suitable mechanism in housing 120 and motor 122 drives screw 74. Constant pressure pumps 124, 125, 126, 127 force the expanding agent from a suitable source through conduits 28, 29, 30, 31 into the barrel of the extruder at a plurality of ports. Each conduit is provided with a pressure gage 28a, 29a, 30a, 31a to accurately determine the pressure of the injected expanding agent. The strands 134 of product extrude through the orifices of die 132 directly into a water bath 136 where they are shock cooled in order to avoid any expansion of the polymer. The strands 134 are maintained below the liquid level of the bath by rollers 138 and 140. The strands 134 are then cut by a chopper 142 into small particles which fall into a container 144.

As an example, polystyrene is fed into hopper 14 and the pentane additive is pumped by the constant pressure pumps and into the barrel 18 of the extruder 16 directly above the cylindrical portion 94 of the chokes. The polystyrene at the metering section C is under a pressure of about 2500–4000 pounds and is at a temperature between about 420 and 500° C. A droplet of the expanding agent is dispersed into each of the grooves 98. As the screw continually turns and material is continuously forced downstream in the extruder barrel, the dispersed droplets of expanding agent follow a flow path around the choke 82 substantially as shown in flow path 99 (FIGURE 3). The expanding agent injected through line 31 must be maintained under a pressure above the pressure of the molten polystyrene. Thus, for example, if the pressure of the molten material at choke 82 is 3000 pounds, the pressure of the expanding agent can be maintained at any pressure above 3000 pounds, for example, 3020 pounds. As the mixture of the expanding agent and polymeric material traverses the mixing section D, the expanding agent and polymeric material become thoroughly admixed. The polymeric material then passes to choke 84 where additional expanding agent is added through conduit 30. The mixture in a similar manner then goes through mixing section E, choke 88 and the final mixing section G. It is understood that the pressure of the expanding agent injected through each of conduits 28, 29, 30 and 31 must be maintained at a pressure in slight excess of the pressure of the mixture of polymeric material and expanding agent. As the polymeric material traverses the length of the extruder barrel, the mixture is cooled to maintain the desired viscosity thereof.

It has also been found that the injection of expanding agent into the first port can be in amounts of about three percent expanding agent, at the second port about two percent can be injected, and at the third port there may be injected one percent. The fourth choke can then be used for better dispersion of the expanding agent or for the injection into the extruder of additives such as those which serve to control cell size, coloring materials, dyes or other additives. Color, dyes or other additives can also be blended into the polymeric material before it is fed to the feed hopper 14 of the extruder.

The mixture of expanding agent and polymeric material from the discharge end of the extruder barrel 18 passes through a die head for making pellets (FIGURE 1) and thereby forms strands 134. The strands 134 are fed directly to a water bath 136 in which they are shock cooled in order to avoid any expansion of the polymer. The bath temperature is maintained in the range of 30–100° F. The cool strands coming from the bath are fed to a chopper 142 wherein they are cut up into small particles which fall into container 144.

The relationship between the various sections of the extruder screw is of a critical nature. It has been found from tests that thermoplastic resin containing an additional ingredient, for example, expanding agent has a different flow characteristic than the resin without expanding agent. Specifically the viscosity of the expandable thermoplastic resin in molten stages is lower than that of the same resin without expanding agent. As the resin is passed through the extruder barrel, the viscosity of the resin tends to become lower as expanding agent is added and the resin progresses through the barrel. This tendency is shown graphically by line $\mu_1$ in FIGURE 7.

Figure 7:
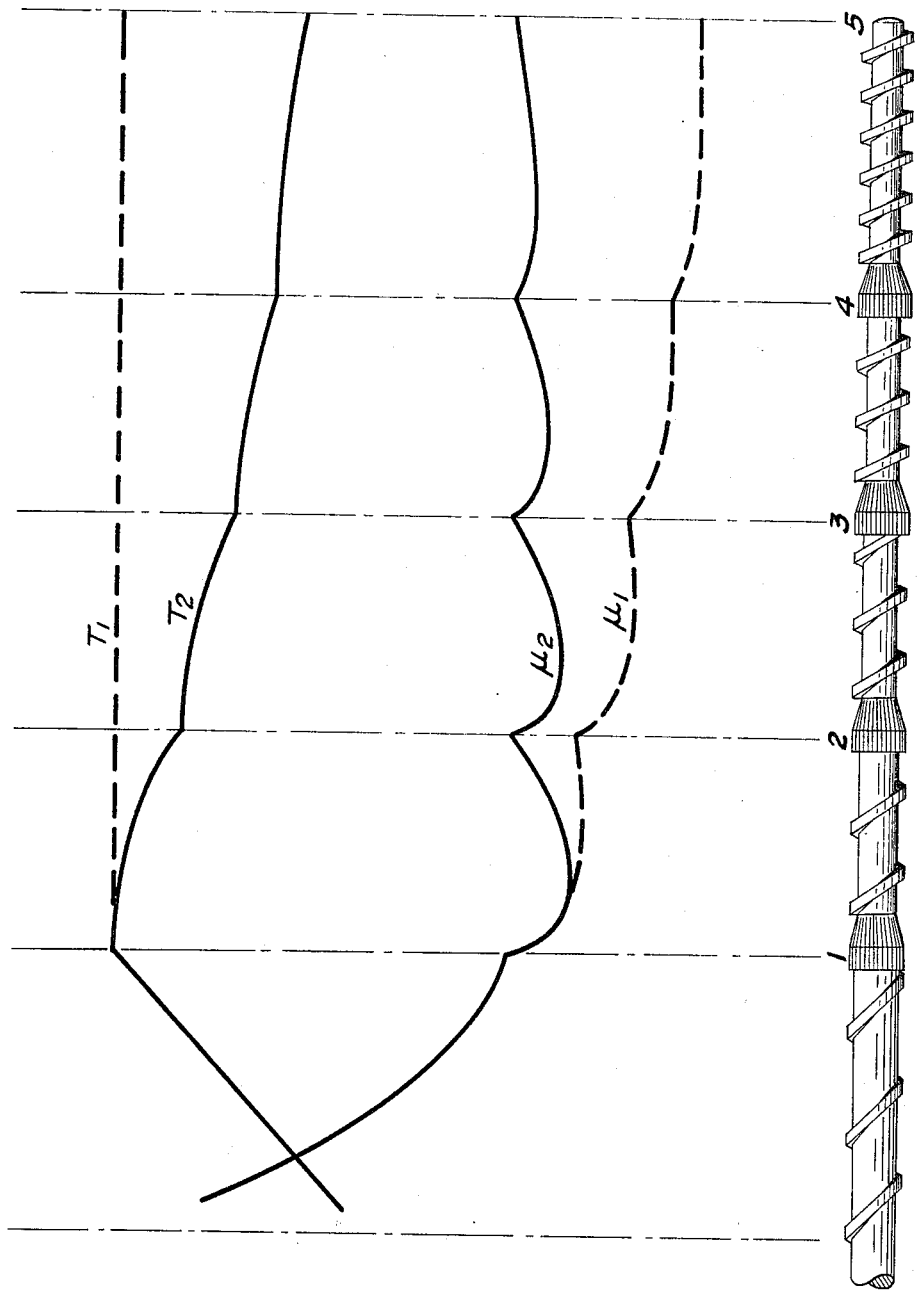
FIGURE 7 is a graph showing the relationship between temperature and viscosity of a thermoplastic resin along the extruder of FIGURE 1.

On the graph shown in FIGURE 7, the temperature and viscosity of the resin with and without expanding agent is plotted against the length location of the extruder barrel. Position 1 on the graph of FIGURE 7 is taken at the first injection point 31 for expanding agent directly above the first choke 82. Position 2 is taken at the expanding agent injection point 30 directly above the second choke 84. Position 3 is taken at the point of injection of expanding agent directly above choke 86, and position 4 is taken at the injection point directly above choke 88. The final position 5 is taken at the discharge end of the extruder screw. Line $T_1$ illustrates a constant temperature maintained throughout the length of the extruder barrel. Line $\mu_1$ illustrates the viscosity characteristics of the resin as it passes through the extruder barrel during a run where the temperature is maintained constant throughout the extruder barrel as illustrated by line $T_1$. The viscosity curve $\mu_1$ assumes that expanding agent is injected into the thermoplastic resin at each of the locations 1, 2, 3 and 4, the mixing of the expanding agent with the thermoplastic resin causing the change in viscosity. The final viscosity as shown by line $\mu_1$ at location 5 is too low for proper extrusion through a multiple orifice die to form strands. If it were attempted to form strands from molten resins having the viscosity shown the resin would not have sufficient body to maintain the resin in strand form.

As shown on curves $T_2$ and $\mu_2$ the viscosity of the resin can be raised if the temperature is lowered. It is therefore possible, by cooling the mass, to obtain an expanding agent containing resin having the proper viscosity at the discharge end of the extruder barrel for forming strands. In attempting to lower the temperature of the resin within the extruder barrel it was found that the temperature could not be adequately decreased because of the heat imparted to the resin by the shear effects of the small channel depth of a conventional extruder. In order to make possible a decrease in temperature whereby the viscosity can be kept more or less constant, it is necessary to increase the channel depth of the screw thereby decreasing the shear effects. At the same time, however, the increased channel depth would convey more resin than in the portion of the screw which does not have this increased channel depth. This would cause a pressure drop in the barrel which, in turn, would cause a partial vacuum which can make the thermoplastic material expand. In order to compensate for the change in channel depth, it is necessary to alter the pitch of the threads on the screw to maintain constant the cross-sectional area in all the mixing sections D, E, F, and G and in the metering section C. In this manner the heat of shear created between the screw and the barrel can be controlled. Accordingly, the temperature generation is controlled and so also is the viscosity.

It is also possible to directly produce a foamed product by the use of the apparatus of this invention. It is necessary when making a foamed product to add a blowing agent adjunct to the thermoplastic material in order to control the cell size in the foamed product. A particularly desirable cell size controlling agent is the multi-component blowing agent adjunct described in Houston et al., U.S. Patent No. 2,941,964, Ingram, U.S. Patent No. 2,941,965, and Pottenger, U.S. Patent No. 3,089,857, composed of a carbon dioxide liberating agent and boric acid or an organic acid having at least about 3.0 milliequivalents of acidic hydrogen per gram. This blowing agent adjunct may be admixed with the thermoplastic material such as polystyrene before the material is fed to the hopper of the extrusion machine.

Figure 5:
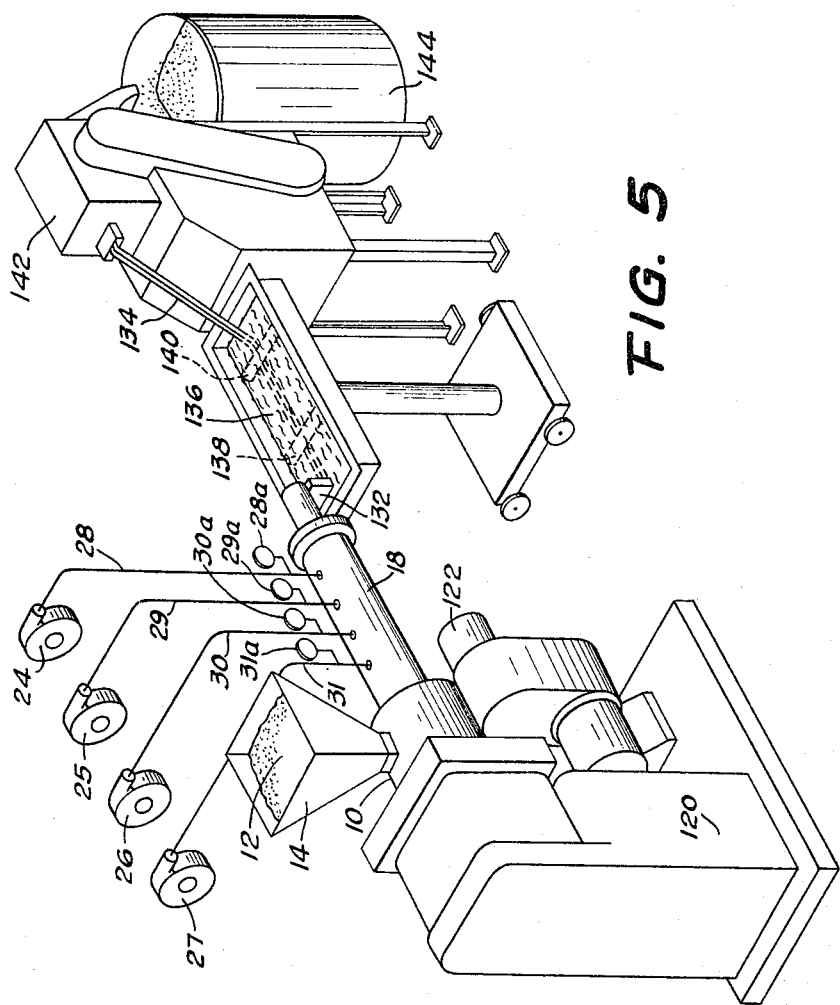
FIGURE 5 shows a partially schematic isometric view of an embodiment of apparatus for forming expandable pellets from a thermoplastic polymeric material.

The apparatus used to form a foamed product such as a foam film is shown in FIGURE 6 wherein a blown film die head 152 has been substituted for the die head 132 for making pellets shown in FIGURE 5. The blown film die head 152 faces upwardly and a tube of blown film 154 is continuously formed and blown out by a flow of air through an air conduit (not shown). The tube of film is directed upwardly to collapsing frames 156 then passed through nip rolls 158, guide rolls 160, 162 and then to a slitting device 164 which slits the film into two sheets 166, 168 which are continuously wound onto rolls 170, 172. In this manner a foam film sheet can be formed directly from feed material. It is necessary when forming a foam film to add a cell size control additive to the feed material. As described hereinabove, this cell size control additive can be a multi-component blowing agent adjunct admixed with the feed material or other cell size control additive either admixed with the feed or injected into the extruder barrel through one of the injecion conduits, for example through conduit 28. For example, it is possible to add carbon dioxide directly into the extruder barrel through conduit 28 as a substitute for the multi-component blowing agent adjunct.

As an illustration of the operation of the novel extruder to produce pellets of expandable polystyrene, a continuous supply of polystyrene particles was fed into the hopper 14, FIGURE 1, of an extruder whose screw flight was divided into a plurality of sections by four chokes. The diameter of the bore of the barrel in this instance was 3½ inches and the distance from zone A through section G was 119 inches. Zone A was 24½ inches in length, zone B was 10½ inches, and zone C was 24½ inches. Each choke was 3½ inches long and had a cylindrical section one inch in length. Each section D, E, and F was 9 inches long. Section G was 18½ inches long. The pitch of the flights in each of zones A, B, and C was 3½ inches. The pitch of the flights varied from sections D through G in the following manner. Section D had a pitch of 3¼ inches; section E, 3 inches; section F, 2½ inches; and section G, 2 inches. The channel depth in zone A was 0.780 inch and in zone C was 0.145 inch with the channel depth in zone B changed from 0.780 to 0.145 inch. In section D the channel depth was 0.155 inch; section E, 0.170 inch; section F, 0.200 inch and section G, 0.250 inch. The extruder was provided with a die plate having 33 ports.

The polystyrene particles were passed through zone A which was maintained at a temperature of 400° F., zone B which was maintained at 375° F., and zone C where the temperature was 385° F. By the time the polystyrene reached the downstream end of zone C, the polystyrene was completely molten.

The first choke 82 divided the molten mass of polystyrene into small streams which flowed through the 45 longitudinal grooves 98. At the upstream end of the choke 82 the pressure was 2800 pounds per square inch gage. At the center of the cylindrical portion 94 of choke 82, five percent of pentane based on the weight of the molten polystyrene was continuously added through line 31 and dispersed into the molten mass in the longitudinal grooves 98 of the choke 82. As the mass flowed through the narrow grooves 98 at a rate greater than the flow through channel 80c, the pressure dropped considerably. The pressure drop is caused by the restriction of the grooves which have a cross-sectional area of about one-half the cross-sectional area of the channel. The relatively high pressure at the upstream end of the choke in comparison to the pressure at the pentane injection point in the center of the cylindrical portion 94 of the choke acts as a barrier against backflow of pentane. The plurality of chokes spaced along the length of the screw provides a series of pressure barriers against such backflow. Although the pressure immediately upstream of choke 82 was 2800 pounds, it was possible to inject the pentane into the streams at a pressure of 2800 pounds per square inch gage because of the pressure drop caused by the choke. The pentane droplets injected into the streams flowed downstream with the molten mass.

The molten streams containing pentane passed from the cylindrical portion 94 to the tapered portion 96 of the choke. At this point the streams began to commingle and the mass was subjected to severe shearing and working between the lands 97 and the barrel 18.

The polystyrene and pentane then passed into mixing section D wherein the ingredients were homogeneously admixed by the shearing and working of the screw. The temperature in section D was maintained at about 400° F.

The pressure in section D adjacent the choke 84 was 1900 pounds per square inch gage. Choke 84 again split the molten mass into a plurality of streams which flowed through the longitudinal grooves thereof. Five percent of pentane was injected through line 30 at choke 84 at a pressure of 1600 pounds per square inch gage. Because of the pressure drop from the upstream end of the choke to the pentane injection point it was possible to use this lower pressure. After the streams passed the cylindrical section of the choke 84, they were commingled and flowed into and through section E.

As the molten mixture passed through section E it was worked and cooled at temperature of 385° F. The pressure at the end of zone E was 1400 pounds per square inch gage. The molten mass was again broken into a plurality of streams and passed through choke 86. Pipe 29 was closed off and no addition was made to the mixture at this point. The working and shearing of the mixture through choke 86 however aided in homogeneously admixing the molten mass. The streams were then commingled and passed through mixing section F which was maintained at a temperature of 300° F. and the pressure at the downstream end of section F was 1200 pounds per square inch gauge.

The molten mass was then once again divided into a plurality of streams at choke 88 and commingled after choke 88 and passed through mixing section G which was maintained at a temperature of 285° F. The pressure at the end of section G was 1300 pounds per square inch gage.

The molten mass was then passed through a 33 port fish tail type die head at a 90° angle and extruded as rods of 1/16 inch diameter directly into a water bath maintained at a temperature of 50° F. The chilled rods passed from the water bath to a chopper 142 where it was cut into pellets of polystyrene measuring 1/8 inch length by 1/16 inch diameter.

Surprisingly, the product while containing the pentane additive had the appearance of crystal polystyrene; it was as clear and transparent as pure polystyrene beads. The product beads had the pentane in suboptical dispersion. Suboptical dispersion is defined as a dispersion of pentane in such small particles that there is no visual indication that the additive is present. The pellets had a volatile content of pentane of 6.74 percent.

The pellets were passed to a preexpander of the type shown in Rodman, U.S. Patent No. 3,023,175, issued February 27, 1962. In the pre-expander, the pellets were agitated and heated and thereby preexpanded. A mold having vent means therein was partially filled with the preexpanded beads. The mold was closed and steam introduced into the mold. After ten minutes, the addition of steam was discontinued, the mold opened, and the product removed. There was obtained a block of cellular polystyrene having uniform small voids and a density of approximately .95 pound per cubic foot. The surface of the polystyrene block was smooth and uniform.

While the foregoing description related to operation with polystyrene, it has been found that a variety of homopolymers and copolymers derived from hydrocarbon vinyl monomers may be used. Such monomers are for example ethylene, styrene, nuclear dimethyl styrenes, isobutylene, vinyl naphthalene, etc. Copolymers of hydrocarbon vinyl monomers such as, for example, styrene and butadiene, styrene and alphamethyl styrene, styrene butadiene and alphamethyl styrene, styrene and isobutylene, styrene and dimethylstyrene, isobutylene and butadiene can be treated according to the process of this invention to produce either free flowing particles capable of being expanded to produce a foamed polymeric structure or the final foamed product in the form of rod or sheet.

The invention is also applicable to particles comprising blends of polymers such as, for example, impact polystyrene which is an admixture of polystyrene with a natural or synthetic rubber. Polystyrene has been limited in many applications by its low impact strength. It is important that a material have a high impact strength when it is to be used for radio cabinets, refrigerator parts, toys, and the like. Heretofore, styrene rubber copolymers have been produced by dissolving rubber in styrene monomer in a separate vessel than that in which the final polymerization is conducted to obtain a rubber monomer solution which is then added to a polymerizing reactor containing water, a suspending agent, and a catalyst. This suspension is polymerized with the aid of heat usually while being agitated through a suitable polymerization cycle to obtain hard bead polymers.

A high impact strength polystyrene can continuously be made in the extruder of this invention by metering a desired amount of rubber into a molten mass of polystyrene and mechanically mixing the components presumably to react the two materials to thereby obtain a high impact product. Generally, when making a high impact polystyrene in the extruder of this invention from 2–10 percent of a rubber is used. It has been discovered that the impact polystyrene made in the extruder of this invention has the desirable properties of having a higher impact strength, improved elongation properties, and a better surface gloss than impact polystyrene made by other methods.

While the foregoing operation used pentane as the expanding agent, the volatile organic compound to be employed as the foaming agent can be any one of a vast number of additives which can be either a liquid or gas. The compounds best suited for the purpose of the invention under normal circumstances are non-solvents or poor solvents for the polymer and having a boiling point not substantially higher than the softening point of the polymer. Preferred volatile organic compounds of a saturated aliphatic hydrocarbon containing from 4–7 carbon atoms in the molecule and perchlorofluoro carbons which compounds have a molecular weight of at least 58 and a boiling point not higher than 95° C. at 760 millimeters absolute pressure. Examples of such volatile organic compounds are methane, ethane, propane, butane, n-pentane, isopentane, neopentane, hexanes, heptanes, trifluoromethane, dichlorodifluoromethane, monochlorotrifluoromethane, sym-tetrachlorodifluoroethane, 1,2,3-trichloro-1,1,2-trifluoroethane, sym-dichlorotetrafluoroethane, 1-chloro-1,1,2,2,2 - pentafluoroethane, 1-chloro-1,2,2,3,3,4,4-heptafluorocyclobutane and 1,2-di-chloro-1,2,3,3,4,4-hexafluorocyclobutane. Mixtures of any two or more of such volatile organic compounds can also be used.

Usually the volatile organic compound is used in amounts of up to 15 parts per 100 parts of polymer. Excellent results have been obtained with about 4–9 parts of blowing agent but greater or lesser amounts may be used depending on the use to which the resulting particles will be put.

Small amounts of additives such as plasticizers, lubricants, dyes, light stabilizing agents, antioxidants, or flame-retarding agents can also be incorporated with the polymeric compositions. Such additives are usually employed in amounts of from 0.02–5 percent by weight or more of the polymer but such additives are not required in the invention.

This invention provides for the manufacture of expanded and expandable polymers in a novel, facile and economical way. The apparatus of the invention, through the intense shearing and mixing and through the design of the extruder screw, yields an extremely fine product. The superior mixing achieved in the novel extruder of the invention yields a clear product when forming expandable polystyrene pellets and a foam product having an extremely uniform cell structure. The superior mixing and shearing effect of the novel extruder is well adapted for use in other fields such as the addition of elastomers to resins to form high impact, graft copolymerized products.

I claim:

1. An extrusion process comprising helically and longitudinally advancing a mass of plastic material through a cylindrical zone having a uniform diameter, whereupon said mass becomes molten due to the pressure and working thereon, dividing said mass into a plurality of small streams, said streams having a velocity which is greater than the velocity of the mass prior to being divided, injecting an additive into said streams, thereafter combining said streams, and forming said mass into a predetermined configuration.

2. An extrusion process comprising helically and longitudinally advancing a mass of polystyrene through a cylindrical zone having a uniform diameter whereupon said mass becomes molten due to the pressure and working thereon, dividing said mass into a plurality of small individual streams, said streams having a velocity which is greater than the velocity of the mass prior to being divided, injecting pentane into said streams, thereafter combining said streams, and forcing said mass into a predetermined configuration.

3. An extrusion process comprising helically and longitudinally advancing a mass of plastic material through a cylindrical zone having a uniform diameter whereupon said mass becomes molten due to the pressure and working thereon, dividing said mass into a plurality of small individual streams, said streams having a velocity which is greater than the velocity of the mass prior to being divided, injecting an additive into said streams, combining said streams, and continuing to pass said mass in said helical path through said cylindrical zone, forcing said mass into a predetermined configuration, said shape of said helical path being deeper and narrower after said streams are combined than before said mass is divided, and the cross-sectional area of said helical path being maintained substantially constant both before said mass is divided and after said streams are combined.

4. An extrusion process for mixing an additive with a thermoplastic material which comprises helically and longitudinally advancing a mass of plastic material through a cylindrical zone whereupon said mass becomes molten due to the pressure and working thereon, dividing said mass into a plurality of small individual streams, said streams having a velocity which is greater than the velocity of the mass prior to being divided, adding highly comminuted increments of an additive to said streams and thereafter combining said streams, maintaining said thermoplastic material at a controlled viscosity throughout said cylindrical zone, and forcing said mass into a predetermined configuration.

5. An extrusion process comprising helically and longitudinally advancing a mass of plastic material through a cylindrical zone having a uniform diameter whereupon said mass becomes molten due to the pressure and working thereon, dividing said mass into a plurality of small individual streams, said streams having a velocity which is greater than the velocity of the mass prior to being divided; injecting highly comminuted increments of an additive into said streams, combining said streams and continuing to pass said mass in said helical path through said cylindrical zone, maintaining a controlled viscosity throughout said cylindrical zone by altering the shape of said helical path in such manner that the shape of said path is deeper and narrower after said streams are combined than before said mass is divided and the cross-sectional area of said helical path is maintained substantially constant both before said mass is divided and after said streams are combined, and forcing said mass into a predetermined configuration.

6. An extruder comprising a barrel having a uniform diameter, a screw rotatable in said barrel and having a helical flight for advancing thermoplastic material under pressure axially of the barrel whereupon said material becomes a molten mass due to the pressure and working thereof, a choke for dividing said flight and splitting said mass into a plurality of small streams, said choke comprising a cylindrical upstream portion and a downstream portion tapering from said upstream portion down to the root of said screw, means for injecting an additive into said streams, said streams being combined at the continuation of said flight, and means for forming said mass into a predetermined configuration.

7. An extruder comprising a barrel having a uniform diameter, a screw rotatable in said barrel and having a root with a helical flight thereon for advancing thermoplastic material under pressure axially of the barrel whereupon said material becomes a molten mass due to the pressure and working thereof, a choke for dividing said flight and splitting said mass into a plurality of small individual streams, and a port in said barrel provided with positive pressure apparatus and a conduit for injecting an additive into said streams, said streams being combined at the continuation of said flight, said choke comprising a cylindrical upstream portion extending to said barrel and a tapered downstream portion which extends from said cylindrical portion to the root of said screw, said choke being provided with longitudinal grooves extending parallel to the axis of the screw.

8. Extruder apparatus comprising an extruder barrel having a uniform diameter, a feed means at the entrance end of said barrel, a die at the exit end of the barrel and a screw for said barrel, said screw including a plurality of interconnected mixing sections longitudinally displaced along its axis and so proportioned that the product of (a) the distance between the outer periphery of the flights and the root of the screw and (b) the pitch of the screw is substantially constant, said distance increasing progressively along said sections while said pitch decreases progressively, and longitudinally grooved chokes interconnecting adjacent mixing sections.

9. Extruder apparatus comprising an extruder barrel having a uniform diameter, a feed means at the entrance end of said barrel, a die at the exit end of the barrel, and a screw for said barrel including a plurality of interconnected mixing sections longitudinally displaced along its axis and so proportioned that the product of (a) the distance between the outer periphery of the flights and the root of the screw and (b) the pitch of the screw is substantially constant, said distance increasing progressively along said sections while said pitch decreases progressively, longitudinally grooved choke interconnecting adjacent mixing sections, and means for injecting an additive into said longitudinal grooves of said chokes.

10. Extruder apparatus comprising an extruder barrel of a uniform diameter having a screw therein, a feed means at the entrance end thereof, and a die at the exit end thereof; said screw having a root with flights thereon, and said screw comprising a plurality of interconnected sections longitudinally displaced along the axis of the screw, said sections including a first section having three zones, at least one intermediate mixing section, and a last mixing section, and a choke between each of said sections, said zones of said first section including a first feed zone, a second transition zone and a third metering zone, the outer diameter of said flights being constant throughout the length of said screw, and the outer diameter of said choke being equal to the outer diameter of said flights; the product of (a) the distance between the outer diameter of said flights and the root of the screw and (b) the pitch of the screw being substantially constant throughout said third metering zone, said intermediate mixing sections, and said last mixing section, while said distance increases progressively from said metering zone to said last section, and said pitch decreases progressively from said metering zone to said last section, said choke comprising a cylindrical upstream portion having a diameter equal to the diameter of said helical flight, a downstream portion tapering from said upstream portion to the root of said screw, and a plurality of grooves in said choke extending substantially parallel to the axis of said screw.

11. Extruder apparatus comprising an extruder barrel of a uniform diameter having a screw therein, a feed means at the entrance end thereof, and a die at the exit end thereof; said screw having a root with flights thereon, and said screw comprising a plurality of interconnected sections longitudinally displaced along the axis of the screw, said sections including a first section having three zones, at least one intermediate mixing section, and a last mixing section, and a choke between each of said sections, said zones of said first section including a first feed zone, a second transition zone and a third metering zone, the outer diameter of said flights being constant throughout the length of said screw, and the outer diameter of said choke being equal to the outer diameter of said flights; the product of (a) the distance between the outer diameter of said flights and the root of the screw and (b) the pitch of the screw being substantially constant throughout said third metering zone, said intermediate mixing sections, and said last mixing section, while said distance increases progressively from said metering zone to said last section, and said pitch decreases progressively from said metering zone to said last section, said choke comprising a cylindrical upstream portion having a diameter equal to the diameter of said helical flight, a downstream portion tapering from said upstream portion to the root of said screw, and a plurality of grooves in said choke extending substantially parallel to the axis of said screw, said grooves having a total cross-sectional area of about one-half of the cross-sectional area in said metering zone and said intermediate mixing section and means for injecting an additive into said grooves in said choke.

12. Extruder apparatus comprising a barrel having a uniform diameter, a feed means at the entrance of the barrel, a die at the exit of the barrel, and a screw for said barrel, said screw having a root and flights thereon, and said screw comprising a plurality of interconnected sections longitudinally displaced along the axis of the screw, said sections including a first section having three zones, at least one intermediate section, a last section, and a longitudinally grooved choke between each of said sections, said choke comprising a cylindrical upstream portion and a downstream portion tapering from said upstream portion down to the root of said screw, said zones of said first section including a feed zone, a transition zone and a metering zone, the outer diameter of said flights being constant throughout the length of said screw, and the outer diameter of said chokes being equal to the outer diameter of said flights; the relationship between said metering zone, said intermediate section and said last section being such that the channel depth progressively increases from said third zone to said last section, and the pitch of said flights progressively decreases from said third zone to said last section, whereby the cross-sectional area of the channel in each of said metering zone and said intermediate and last sections is maintained substantially constant.

13. Extruder apparatus comprising a barrel having a uniform diameter, a feed means at the entrance of the barrel, a die at the exit of the barrel, and a screw for said barrel, said screw having a root and flights thereon, and said screw comprising a plurality of interconnected sections longitudinally displaced along the axis of the screw, said sections including a first section having three zones, at least one intermediate section, a last section, and a longitudinally grooved choke between each of said sections, said zones of said first section including a feed zone, a transition zone and a metering zone, the outer diameter of said flights being constant throughout the length of said screw, and the outer diameter of said chokes being equal to the outer diameter of said flights; the relationship between said metering zone, said intermediate section and said last section being such that the channel depth progressively increases from said third zone to said last section, and the pitch of said flights progressively decreases from said third zone to said last section, whereby the cross-sectional area of the channel in each of said metering zone and said intermediate and last sections is maintained substantially constant, said choke comprising a cylindrical portion having a diameter equal to the diameter of said helical flight and a downstream portion tapering from said upstream portion to the root of said screw, and a plurality of grooves in said choke extending substantially parallel to the axis of said screw, said grooves having a total cross-sectional area of about one-half of the cross-sectional area of the channel in said metering zone and said intermediate section and a port in said barrel provided with positive pressure apparatus and a small bore conduit for injecting an additive into said grooves of said choke.

14. An extruder comprising a barrel having a uniform diameter, a screw rotatable in said barrel and having a helical flight for advancing thermoplastic material under pressure axially of the barrel whereupon said material becomes a molten mass due to the pressure and working thereof, a plurality of chokes for dividing said flight and splitting said mass into a plurality of small streams, said chokes comprising a cylindrical upstream portion and a downstream portion tapering from said upstream portion down to the root of said screw, a plurality of means for injecting an additive into said streams, each of said means for injecting another material comprising a port in said barrel, a pump and a conduit, and a die for forming said mass into a predetermined configuration.

References Cited by the Examiner
UNITED STATES PATENTS

| | | | |
|---|---|---|---|
| 2,308,632 | 1/1943 | Stenberg | 264—349 |
| 2,698,962 | 1/1955 | Swallow | 264—349 |
| 2,702,412 | 2/1955 | Brown | 264—176 |
| 2,736,058 | 2/1956 | Dellheim. | |
| 2,753,595 | 7/1956 | Dulmage. | |
| 2,765,491 | 10/1956 | Magerkurth. | |
| 2,791,806 | 5/1957 | Tordella | 264—176 |
| 2,810,159 | 10/1957 | Teichmann. | |
| 2,838,801 | 6/1958 | De Long et al. | 264—53 XR |
| 2,883,357 | 4/1959 | Hardy | 260—37 |
| 2,895,935 | 7/1959 | Archer et al. | 260—37 |
| 2,928,130 | 3/1960 | Gray | 264—50 |
| 2,987,774 | 6/1961 | Jacobson | 264—53 |
| 3,026,272 | 3/1962 | Rubens et al. | |
| 3,060,512 | 10/1962 | Martin et al. | 264—41 XR |
| 3,089,857 | 5/1963 | Pottenger | 264—53 XR |
| 3,121,132 | 2/1964 | Del Bene | 264—53 XR |
| 3,160,688 | 12/1964 | Aykanian et al. | 264—53 |
| 3,174,185 | 3/1965 | Gerber. | |

ROBERT F. WHITE, *Primary Examiner.*

J. R. DUNCAN, P. E. ANDERSON,
*Assistant Examiners.*